US008880815B2

(12) United States Patent
Alexandron et al.

(10) Patent No.: US 8,880,815 B2
(45) Date of Patent: Nov. 4, 2014

(54) LOW ACCESS TIME INDIRECT MEMORY ACCESSES

(75) Inventors: Nimrod Alexandron, Shimshit (IL); Alexander Rabinovitch, Kfar Yona (IL); Leonid Dubrovin, Karney Shomron (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 338 days.

(21) Appl. No.: 13/400,212

(22) Filed: Feb. 20, 2012

(65) Prior Publication Data

US 2013/0219131 A1    Aug. 22, 2013

(51) Int. Cl.
*G06F 12/00* (2006.01)
*G06F 12/02* (2006.01)
*G06F 12/06* (2006.01)

(52) U.S. Cl.
CPC ............... *G06F 12/02* (2013.01); *G06F 12/06* (2013.01)
USPC ........... 711/154; 711/214; 711/219; 711/213; 711/E21.001

(58) Field of Classification Search
CPC .......... G06F 12/00; G06F 12/02; G06F 12/06
USPC ............................. 711/214, 213, 219, E12.001
See application file for complete search history.

(56) References Cited

U.S. PATENT DOCUMENTS

| 4,047,245 | A | 9/1977 | Knipper ........................ 364/200 |
|---|---|---|---|
| 5,890,222 | A | 3/1999 | Agarwal et al. ............... 711/220 |
| 6,058,467 | A | 5/2000 | Broxterman et al. .......... 712/32 |
| 6,734,865 | B1 * | 5/2004 | Peterson et al. .............. 345/544 |
| 7,296,136 | B1 | 11/2007 | Collard et al. ................ 711/203 |
| 7,305,543 | B2 | 12/2007 | Goodhue et al. .............. 712/220 |
| 7,990,391 | B2 * | 8/2011 | Radke ........................... 345/543 |
| 8,006,078 | B2 * | 8/2011 | Lee et al. ....................... 712/233 |
| 2005/0030313 | A1 * | 2/2005 | Radke et al. .................. 345/532 |
| 2009/0198904 | A1 | 8/2009 | Arimilli et al. ............... 711/137 |

* cited by examiner

*Primary Examiner* — Pierre-Michel Bataille
(74) *Attorney, Agent, or Firm* — Christopher P. Maiorana, PC

(57) ABSTRACT

An apparatus having a memory and a controller is disclosed. The controller may be configured to (i) receive a read request from a processor, the read request comprising a first value and a second value, (ii) where the read request is an indirect memory access, (a) generate a first address in response to the first value, (b) read data stored in the memory at the first address and (c) generate a second address in response to the second value and the data, (iii) where the read request is a direct memory access, generate the second address in response to the second value and (iv) read a requested data stored in the memory at the second address.

20 Claims, 4 Drawing Sheets

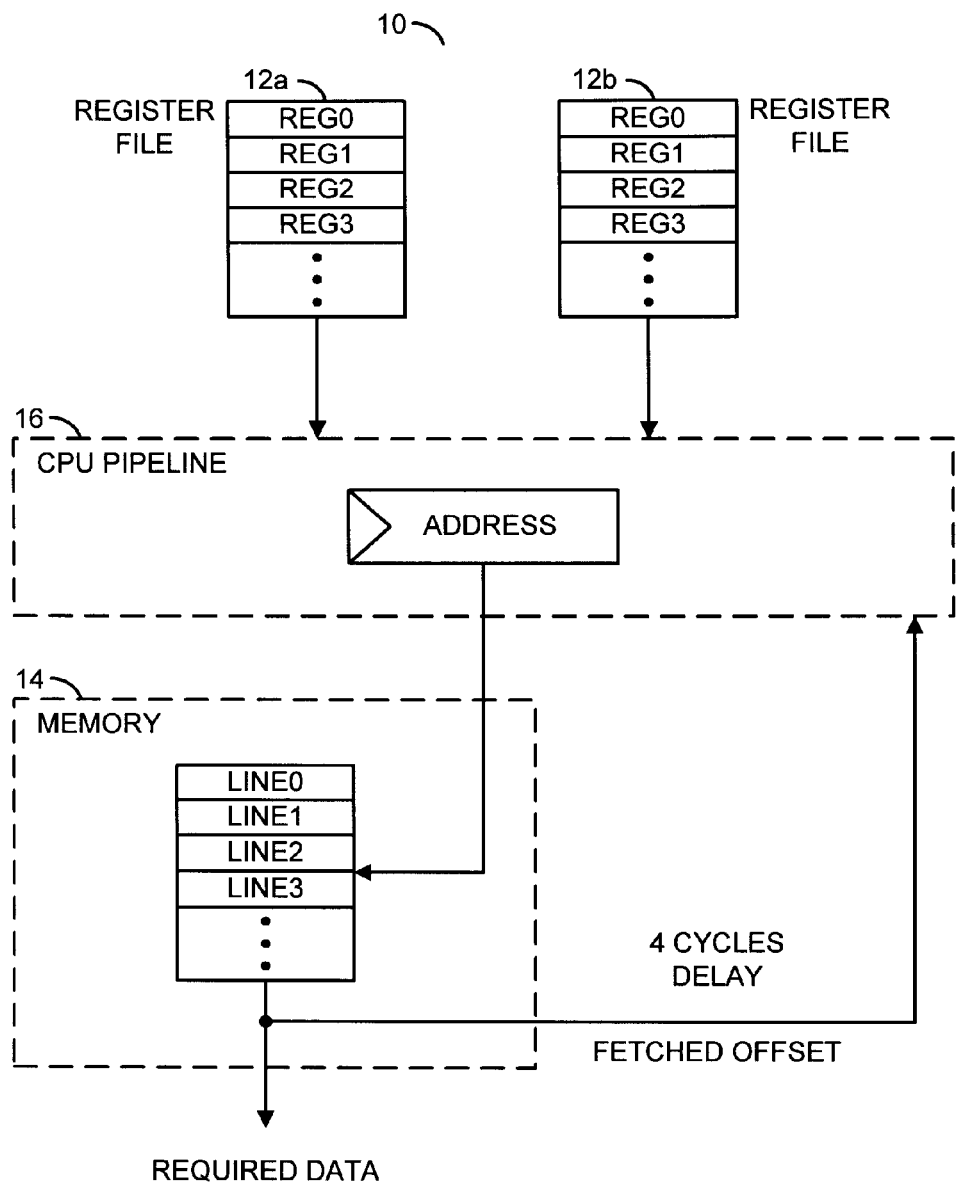
FIG. 1
(CONVENTIONAL)

LOW ACCESS TIME INDIRECT MEMORY ACCESSES

FIELD OF THE INVENTION

The present invention relates to memory systems generally and, more particularly, to a method and/or apparatus for implementing low access time indirect memory accesses.

BACKGROUND OF THE INVENTION

Indirect memory accesses are part of a code base in many applications such as control code applications, video encoder applications, video decoder applications and baseband 3GPP Long Term. Evolution applications. A common example of an indirect memory access in software is:
   Char D,C;
   Array B[100];
   D=B[C].
To retrieve data for the character D, a digital signal processor (i.e., DSP) core performs the following operations:
   1. Read a value of the character C from the memory,
   2. Add the value of character C to a start address of the array B to create a next address, and
   3. Read a value of the character D from the memory stored at the next address.

The indirect memory access operations take a considerable number of cycles when executed on modern DSP cores. A reason for the cycle count is a pipeline latency from receiving the value C from the memory, calculating the next address from the value C and using the next address to access the memory for the value D.

Referring to FIG. 1, a block diagram of a conventional indirect memory access design 10 is shown. Consider a conventional DSP core pipeline 16 having an address generation stage (i.e., stage G), an address to memory stage (i.e., stage A), a memory access stage (i.e., stage C) and a sample memory stage (i.e., stage S). Register files 12a-12b are used to store initial information used to address a memory 14 in the stage G. Once the address for the value C is generated in the stage G and stored in a register ADDRESS, three cycles (i.e., stages A, C and S) are used to return the value C from a line in the memory 14 to the DSP core. The next address is subsequently calculated in the stage G in another cycle and stored in the register ADDRESS. Finally, three more cycles (i.e., stages A, C and S) are used to return the value D from the memory 14 to a register in the DSP core.

It would be desirable to implement low access time indirect memory accesses.

SUMMARY OF THE INVENTION

The present invention concerns an apparatus including a memory and a controller. The controller may be configured to (i) receive a read request from a processor, the read request comprising a first value and a second value, (ii) where the read request is an indirect memory access, (a) generate a first address in response to the first value, (b) read data stored in the memory at the first address and (c) generate a second address in response to the second value and the data, (iii) where the read request is a direct memory access, generate the second address in response to the second value and (iv) read a requested data stored in the memory at the second address.

The objects, features and advantages of the present invention include providing a method and/or apparatus for implementing low access time indirect memory accesses that may (i) use fewer clock cycles for the indirect memory accesses than common techniques, (ii) implement a single read request to achieve an indirect memory access, (iii) calculate an indirect address within a memory controller, (iv) return a single requested value to fulfill the single read request and/or (v) be implemented within a memory circuit.

BRIEF DESCRIPTION OF THE DRAWINGS

These and other objects, features and advantages of the present invention will be apparent from the following detailed description and the appended claims and drawings in which:

FIG. 1 is a block diagram of a conventional indirect memory access design;

DETAILED DESCRIPTION OF THE PREFERRED EMBODIMENTS

In some embodiments of the present invention, a digital signal processor (e.g., DSP) core preforming a memory read request may pass to a memory circuit all of (i) a pointer address, (ii) an offset address and (iii) a size value. The pointer address generally identifies a base address of an array stored in one or more blocks of memory. The offset address may identify where an offset value is stored in a block of the memory. The size value may indicate a bit-size of the elements in the array (e.g., the bit-size of the offset value). A memory controller, implemented within the memory circuit, generally fetches the offset value from the block of memory without returning the offset value to the DPS core. The offset value may be shifted according to the size value and subsequently added to base address of the array (e.g., added to the pointer address) by the controller to identify where a target (or requested) data value is stored in the memory. The resulting address is used by the controller to fetch the target data value from the corresponding block or blocks of memory. The target data value may be sent to the DSP core to complete the memory read request (or read access).

Figure 2:
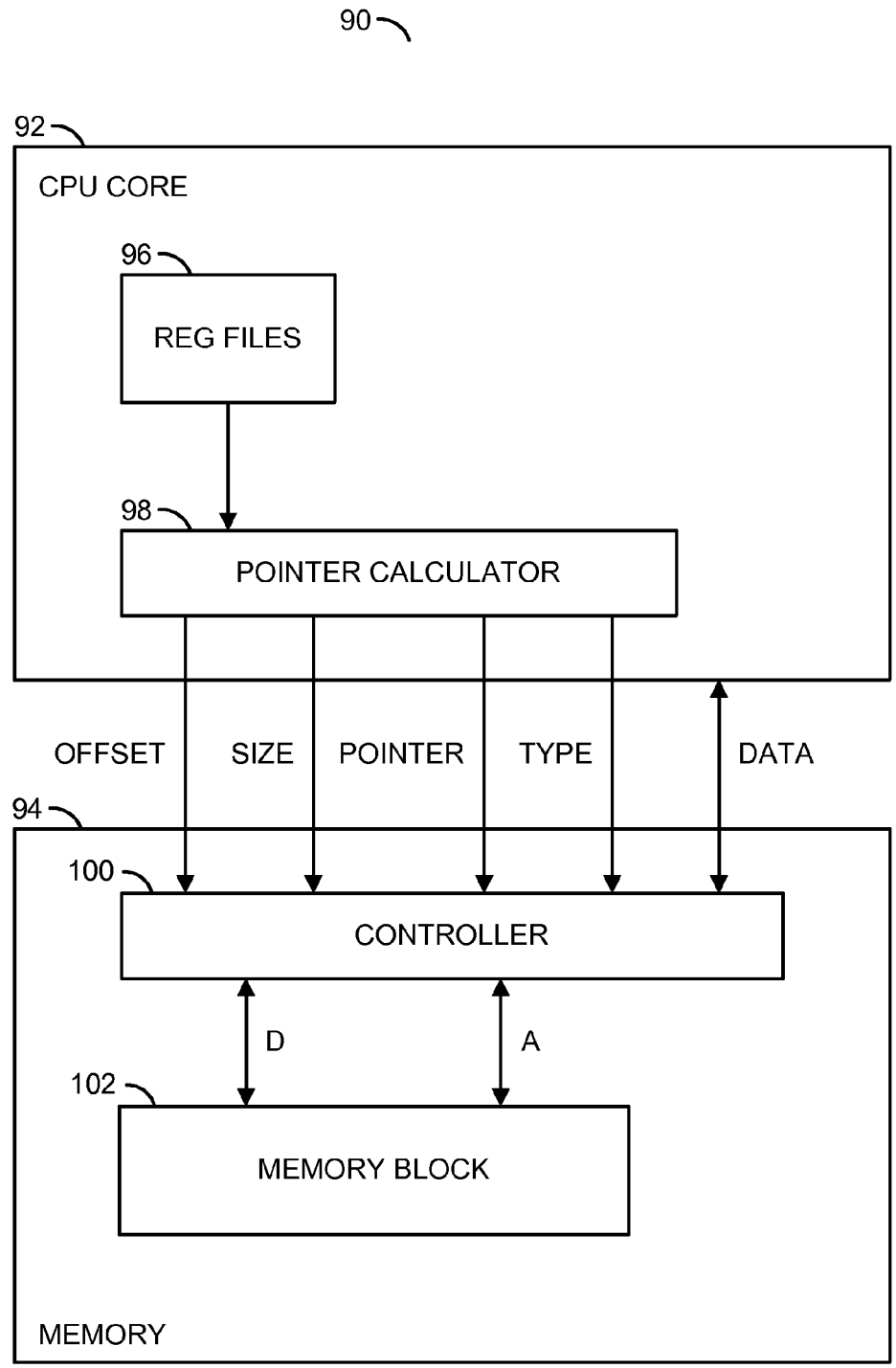
FIG. 2 is a block diagram of an apparatus in accordance with a preferred embodiment of the present invention.

Referring to FIG. 2, a block diagram of an apparatus 90 is shown in accordance with a preferred embodiment of the present invention. The apparatus (or circuit or device or integrated circuit) 90 may implement a pipelined processor with an associated memory circuit capable of quickly responding to an indirect memory access. The apparatus 90 generally comprises a block (or circuit) 92 and a block (or circuit) 94. The circuit 92 generally comprises a block (or circuit) 96 and a block (or circuit) 98. The circuit 94 generally comprises a block (or circuit) 100 and a block (or circuit) 102. The circuits 92 to 102 may represent modules and/or blocks that may be implemented as hardware, software, a combination of hardware and software, or other implementations.

A signal (e.g., OFFSET) conveying the offset address may be generated by the circuit 98 and transferred to the circuit 100. The circuit 98 may also generate a signal (e.g., SIZE) carrying the size value to the circuit 100. A signal (e.g., POINTER) conveying the pointer address may be generated by the circuit 98 and transferred to the circuit 100. An optional signal (e.g., TYPE) that conveys a flag which identifies a memory access as either direct or indirect may be generated by the circuit 98 and presented to the circuit 100. The circuit 100 may exchange a signal (e.g., D) carrying stored data, information and/or addresses with the circuit 102. A signal (e.g., A) may present address values from the circuit 100 to the circuit 102. A signal (e.g., DATA) may convey the requested target data value from the circuit 100 back to the circuit 92.

The circuit 92 may implement a DSP core circuit. The circuit 92 is generally operational to execute (or process) instructions (or programs) to carry out a number of tasks. Data consumed by and generated by the instructions may also be read (or loaded) from the circuit 94 and written (or stored) to the circuit 94. In some embodiments, the circuit 92 may include a pipeline. The pipeline within the circuit 92 may implement a software pipeline. In some embodiments, the pipeline may implement a hardware pipeline. In other embodiments, the pipeline may implement a combined hardware and software pipeline.

The circuit 94 may implement a memory circuit. The circuit 94 is generally operational to store both data and instructions (or software programs or code) used by and generated by the circuit 92. In some embodiments, the circuit 94 may be implemented as two or more circuits with some storing the data and others storing the instructions.

The circuit 96 may implement a register file circuit. The circuit 96 is generally operational to buffer the data and the software used by the circuit 92. Some of the registers within the circuit 96 may be dedicated registers that buffer (or hold) certain data, instructions and/or other information (e.g., addresses, offsets, counters and pointers). Other registers within the circuit 96 may be general purpose registers used to buffer (or hold) data, instructions and/or information as determined by the programs.

The circuit 100 may implement a memory controller. The circuit 100 is generally operational to perform various operations in response to read requests and write requests. The circuit 100 may use the signal TYPE and/or the offset address (or value) to distinguish between direct memory accesses and indirect memory accesses. The signal TYPE generally has either (i) a flag value that indicates the indirect access mode (or state) or (ii) another flag value that indicates the direct access mode (or state). The offset address may have a predetermined value (e.g., a zero value) that indicates the direct access mode. Any other value in the offset address may indicate the indirect access mode (or state). Where the signal TYPE is implemented, a conflict between the signal TYPE and the offset address may be resolved by the circuit 100 using a predetermined priority (e.g., the signal TYPE is correct).

For a read request (or access) corresponding to an indirect memory access, the circuit 100 may receive the offset address (or value), the size value and the pointer address (or value) along with the signal TYPE from the circuit 98. The circuit 100 may present the offset address in the signal A to the circuit 102 to read an indirect (or intermediate) address value stored in the circuit 102. The indirect address (or data) value may be returned from the circuit 102 to the circuit 100 via the signal D. The circuit 100 may calculate a next (or new) address in response to the pointer address, the size value and the indirect address value received from the circuit 102. The next address may be transferred in the signal A to the circuit 102 to access the target (or requested) data value. The target data value may be read from memory at the next address and returned to the circuit 100 in the signal D. The circuit 100 may subsequently transfer the target data value to the circuit 92 in the signal DATA to fulfill the read request.

For a read request corresponding to a direct memory access, the circuit 100 may receive the offset address (or value), the size value and the pointer address (or value) along with the signal TYPE from the circuit 98. The circuit 100 may present the pointer address to the circuit 102 in the signal A to access the target (or requested) data value. The circuit 102 may pass the target data value back to the circuit 100 in the signal D. The circuit 100 may transfer the target data value in the signal DATA to the circuit 92 to fulfill the read request.

Figure 3:
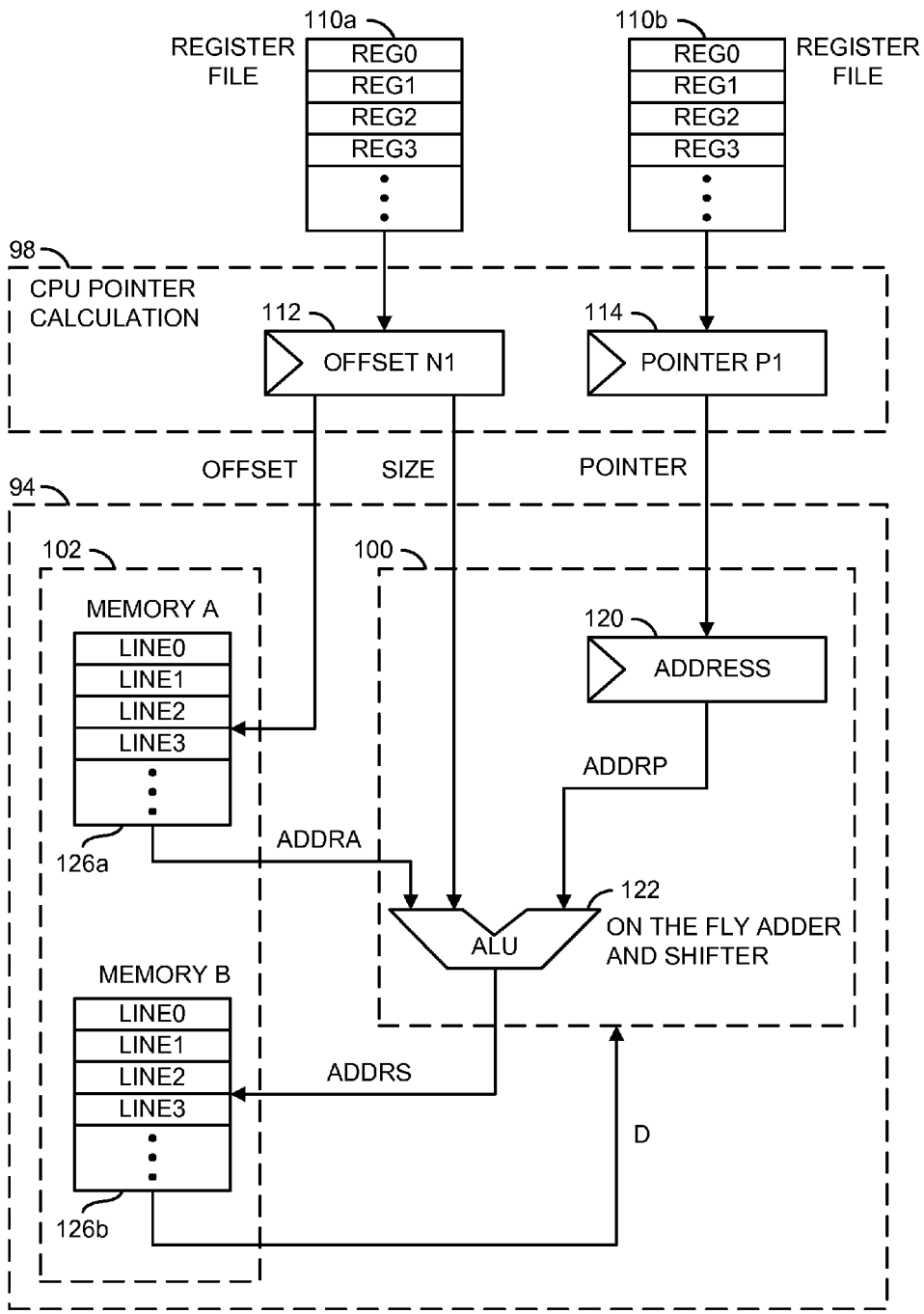
FIG. 3 is a functional block diagram of an example partial implementation of circuits in the apparatus.

Referring to FIG. 3, a functional block diagram of an example partial implementation of the DSP core and the memory circuits is shown. The circuit 96 generally comprises multiple blocks (or circuits) 110a-110b. The circuit 98 generally comprises a block (or circuit) 112 and a block (or circuit) 114. The circuit 100 generally comprises a block (or circuit) 120 and a block (or circuit) 122. The circuit 102 generally comprises a multiple blocks (or circuits) 126a-126b. The circuits 110a to 126b may represent modules and/or blocks that may be implemented as hardware, software, a combination of hardware and software, or other implementations.

The signal OFFSET may be generated by the circuit 112 and transferred through the circuit 100 to the circuit 102 (e.g., 126a). The signal SIZE may also be generated by the circuit 112 and received by the circuit 100 (e.g., 122). The circuit 114 may generate the signal POINTER that is transferred to the circuit 100 (e.g., 120). The circuit 102 may generate a signal (e.g., ADDRA) that is received by the circuit 122. In various points in time, the signal ADDRA may be the same as the signal D illustrated in FIG. 2. A pointer signal (e.g., ADDRP) may be generated by the circuit 120 and received by the circuit 122. The circuit 122 may generate a summation signal (e.g., ADDRS) that is transferred to the circuit 102 (e.g., 126b). In various points in time, the signal ADDRS may be the same as the signal A illustrated in FIG. 2. The signal D may be generated by the circuit 102 (e.g., 126b) by reading the target data value stored at the address in the signal ADDRS. The target data value may be received by the circuit 100 via the signal D.

The circuits 110a-110b may implement register file circuits. Each circuit 110a-110b may be operational to store information (e.g., data, instructions, addresses) used by the circuit 92. In some situations, the circuit 110a may store address information used to identify where an indirect address value (e.g., the value C in the example) is stored in the circuit 102. The circuit 110a may also store the size information used by the circuit 100 to align the indirect address value stored in the circuit 102 with the pointer address value. The information stored in the circuit 110a may be copied into the circuit 112. The circuit 110b may be used to store address information used to identify direct memory access address values and base address values of arrays (e.g., array B in the example). The information stored in the circuit 110b may be copied into the circuit 114.

The circuit 112 may implement a register circuit. The circuit 112 is generally operational to store the offset address and the size value. The offset address may be presented in the signal OFFSET. The size value may be presented in the signal SIZE. In some embodiments, the circuit 112 may be implemented as multiple (e.g., 2) registers, a register for the offset address and another register for the size value.

The circuit 114 may implement a register circuit. The circuit 114 is generally operational to store the pointer address. The pointer address may be presented to the circuit 100 in the signal POINTER.

The circuit 120 may implement a register circuit. The circuit 120 is generally operational to store the pointer address received in the signal POINTER. The circuit 100 may use the pointer address as an internal address in calculating the target address of the target data value. The pointer address may be presented by the circuit 120 to the circuit 122 in the signal ADDRP.

The circuit 122 may implement an arithmetic logic unit (e.g., ALU) circuit. The circuit 122 is generally operational to multiply the indirect address value received in the signal ADDRA by the size value received in the signal SIZE. The circuit 122 may multiply (e.g., left shift) the indirect address value in terms of the element size. If the element size is a single byte, no shifting is generally performed. Where the left shifts are performed, the shifted value may be padded with zeros from the right. The shifted address may be added to the pointer address received in the signal ADDRP. The resulting sum value (or address) may be presented in the signal ADDRS as the target address of the target data value.

The circuits 126a-126b may implement memory blocks within the circuit 102. Each circuit 126a-126b is generally operational to store data, information and/or instructions used by the circuit 92. The circuits 126a-126b are generally accessible via the address values in the signal A (FIG. 2). While servicing an indirect memory address, the circuits 126a-126b may be accessible at different times via the address values received in the signals OFFSET and ADDRS (FIG. 3). As illustrated, the circuit 126a may be allocated to an array that is indexed from a base address value by the offset address value. Although shown being stored in different circuits 126a-126b, the indirect address value and the target data value may be stored in any of the circuits 126a-126b, including the same circuit 126a-126b.

Figure 4:
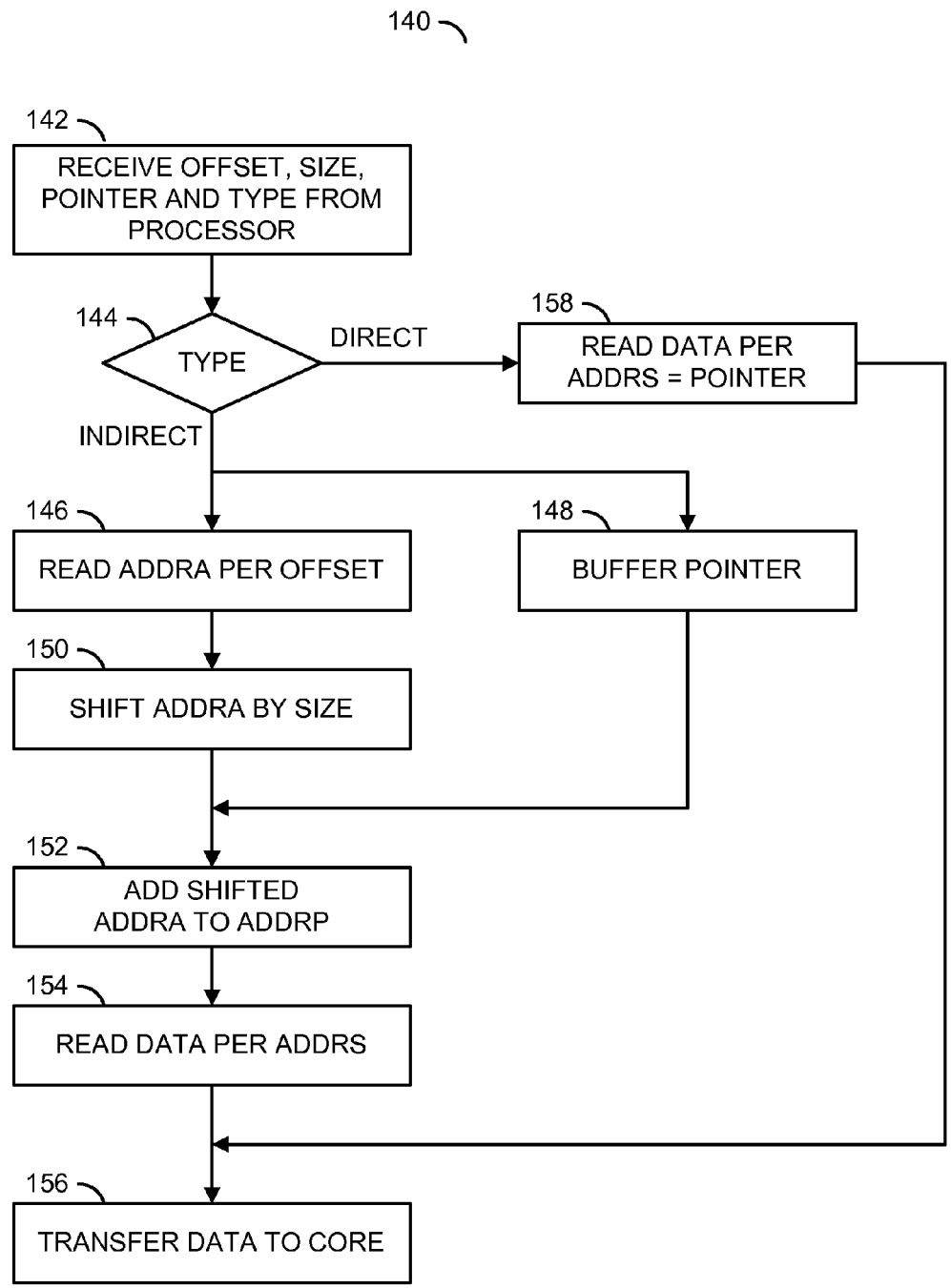
FIG. 4 is a flow diagram of an example method for a low access time indirect memory access.

Referring to FIG. 4, a flow diagram of an example method 140 for a low access time indirect memory access is shown. The method (or process) 140 may be implemented in the circuit 94. The method 140 generally comprises a step (or state) 142, a step (or state) 144, a step (or state) 146, a step (or state) 148, a step (or state) 150, a step (or state) 152, a step (or state) 154 and a step (or state) 156. The steps 142-156 may represent modules and/or blocks that may be implemented as hardware, software, a combination of hardware and software, or other implementations.

In the step 142, the circuit 94 may receive the offset address, size value and the pointer address associated with a read request (or access) from the circuit 98. In some embodiments, the circuit 94 may also receive the type value from the circuit 98. Based on the offset address and/or the type value, the circuit 94 may determine if the read request is an indirect memory access or a direct memory access. Where the offset address is used, a predetermined address value (e.g., a zero value) may be used to indicate that the read request is a direct memory access type of request. All other non-predetermined offset address values may be used to indicate that the read request is an indirect memory access type of request. Where the type value is used, an indirect type value (e.g., a logical one) generally indicates an indirect memory access. A direct type value (e.g., a logical zero) generally indicates a direct memory access.

For the indirect memory accesses, the circuit 94 (e.g., 126a) may read the indirect address (or data) value stored at the address identified by the offset address value in the step 146. The indirect address value may be transferred from the circuit 102 (e.g., 126a) to the circuit 100 (e.g., 122). In the step 148, the circuit 100 (e.g., 120) may buffer the pointer address received from the circuit 98.

In the step 150, the circuit 100 (e.g., 122) may shift (or multiply) the indirect address value in the signal ADDRA by the size value in the signal SIZE. The shifting may be used to account for differences in the size of the indirect address value (e.g., 8, 16, 32 or 64 bits) and the size of the address space (e.g., 32 or 40 bits). Once the indirect address value has been shifted an appropriate amount, the circuit 122 may add the shifted indirect address value to the pointer address value in the step 152. The sum of the two address values may be the target address where the target (or requested) data value is stored within the circuit 102. In the step 154, the target data value may be read from the circuit 102 (e.g., 126b) per the target address value in the signal ADDRS. The target data value may be transferred from the circuit 94 to the circuit 92 in the step 156.

Where the offset value and/or type value indicate that the read request is a direct memory access type request, the circuit 122 may copy the pointer address from the signal ADDRP to the signal ADDRS in the step 158. The target data value may be read from the pointer address and transferred from the circuit 94 to the circuit 92 in the step 156.

Implementation of the method 140 with a DSP core may reduce the number of cycle counts used to read the target data value in an indirect read down to a few (e.g., 3) cycles (e.g., stages A, C and S). Compared with the common indirect memory accesses that use 6 or more cycles, at least a 50% improvement of the cycle count may be realized for code having the indirect memory accesses. The fewer cycles generally result in a reduction of the whole application cycle count thus providing a low access time to the requested target data.

The functions performed by the diagrams of FIGS. 2-4 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 1 and 3 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory; and
a controller configured to (i) receive a read request from a processor, said read request comprising a first value and a second value, (ii) where said read request is an indirect memory access, (a) present said first value to said memory as a first address, (b) read address data stored in said memory at said first address and (c) generate a second address in response to a combination of said second value and said address data, (iii) where said read request is a direct memory access, generate said second address by copying said second value and (iv) read a requested data stored in said memory at said second address.

2. The apparatus according to claim 1, wherein said controller is further configured to transfer said requested data to said processor to fulfill said read request.

3. The apparatus according to claim 1, wherein said read request further comprises a third value.

4. The apparatus according to claim 3, wherein (i) said controller is further configured to shift said address data by said third value and (ii) said second address is generated by adding said second value to said address data as shifted in response to said indirect memory access.

5. The apparatus according to claim 1, wherein said controller is further configured to determine that said read request is either said direct memory access or said indirect memory access.

6. The apparatus according to claim 5, wherein said first value determines said direct memory access or said indirect memory access.

7. The apparatus according to claim 1, wherein said read request further comprises a flag that determines said direct memory access or said indirect memory access.

8. The apparatus according to claim 1, wherein said indirect memory access is completed in response to only one request from said processor.

9. The apparatus according to claim 1, wherein (i) said second value is a pointer to a base address of an array in said memory and (ii) said requested data is stored in said array at an offset from said base address in response to said indirect memory access.

10. The apparatus according to claim 1, wherein said apparatus is implemented as one or more integrated circuits.

11. An apparatus comprising:
means for storing;
means for receiving a read request from a processor, said read request comprising a first value and a second value;
means for generating addresses configured to (i) present said first value to said means for storing as a first address, (ii) read address data stored in said means for storing at said first address, and (iii) generate a second address in response to a combination of said second value and said address data where said read request is an indirect memory access;
means for generating said second address by copying said second value where said read request is a direct memory access; and
means for reading a requested data stored in said means for storing at said second address.

12. A method for low access time indirect memory accesses, comprising the steps of:
(A) receiving a read request at a controller from a processor, said read request comprising a first value and a second value;
(B) where said read request is an indirect memory access,
(i) presenting said first value to a memory as a first address,
(ii) reading address data stored in said memory at said first address, and
(iii) generating a second address in response to a combination of said second value and said address data;
(C) where said read request is a direct memory access, generating said second address by copying said second value; and
(D) reading a requested data stored in said memory at said second address to said controller.

13. The method according to claim 12, further comprising the step of:
transferring said requested data to said processor to fulfill said read request.

14. The method according to claim 12, wherein said read request further comprises a third value.

15. The method according to claim 14, further comprising the step of:
shifting said address data by said third value, wherein said second address is generated by adding said second value to said address data as shifted in response to said indirect memory access.

16. The method according to claim 12, further comprising the step of:

determining that said read request is either said direct memory access or said indirect memory access using said controller.

17. The method according to claim 16, wherein said first value determines said direct memory access or said indirect memory access.

18. The method according to claim 12, wherein said read request further comprises a flag that determines said direct memory access or said indirect memory access.

19. The method according to claim 12, wherein said indirect memory access is completed in response to only one request from said processor.

20. The method according to claim 12, wherein (i) said second address is a pointer to a base address of an array in said memory and (ii) said requested data is stored in said array at an offset from said base address in response to said indirect memory access.

* * * * *